United States Patent [19]
Purselley

[11] 3,945,144
[45] Mar. 23, 1976

[54] TROTLINE FISHHOOK HOLDER AND DISPENSER

[76] Inventor: Audie C. Purselley, 1507 E. Main St., Mesa, Ariz. 85203

[22] Filed: Apr. 14, 1975

[21] Appl. No.: 567,511

[52] U.S. Cl. .............................. 43/54.5 A; 43/27.4
[51] Int. Cl.² ......................................... A01K 97/06
[58] Field of Search ........................ 43/54.5 A, 27.4

[56] References Cited
UNITED STATES PATENTS

| | | | |
|---|---|---|---|
| 2,555,397 | 6/1951 | Coward | 43/54.5 A |
| 2,804,716 | 9/1957 | Adkison | 43/54.5 A |
| 3,029,545 | 4/1962 | Hess et al. | 43/54.5 A |
| 3,047,978 | 8/1962 | Glover | 43/54.5 A |
| 3,060,622 | 10/1962 | Lowry | 43/54.5 A |
| 3,466,785 | 9/1969 | Shook | 43/54.5 A X |

*Primary Examiner*—Hugh R. Chamblee
*Assistant Examiner*—Daniel J. Leach
*Attorney, Agent, or Firm*—Warren F. B. Lindsley

[57] ABSTRACT

A novel tubular trotline fishhook holder and dispenser comprising a handle portion removably clampable to a transom of a boat and a hook storage compartment extending from one end of the handle portion at an obtuse angle therewith. The storage compartment is provided with a shaft extending longitudinally thereof for supporting the bend portions of the hooks on spaced stringers of the trotline in one direction with one end of the shaft being fixedly attached interiorly of the holder adjacent the handle portion and extending outwardly of the free end of the storage compartment and being movable laterally of the holder for aiding in removing the hooks from the holder.

6 Claims, 5 Drawing Figures

U.S. Patent  March 23, 1976  3,945,144
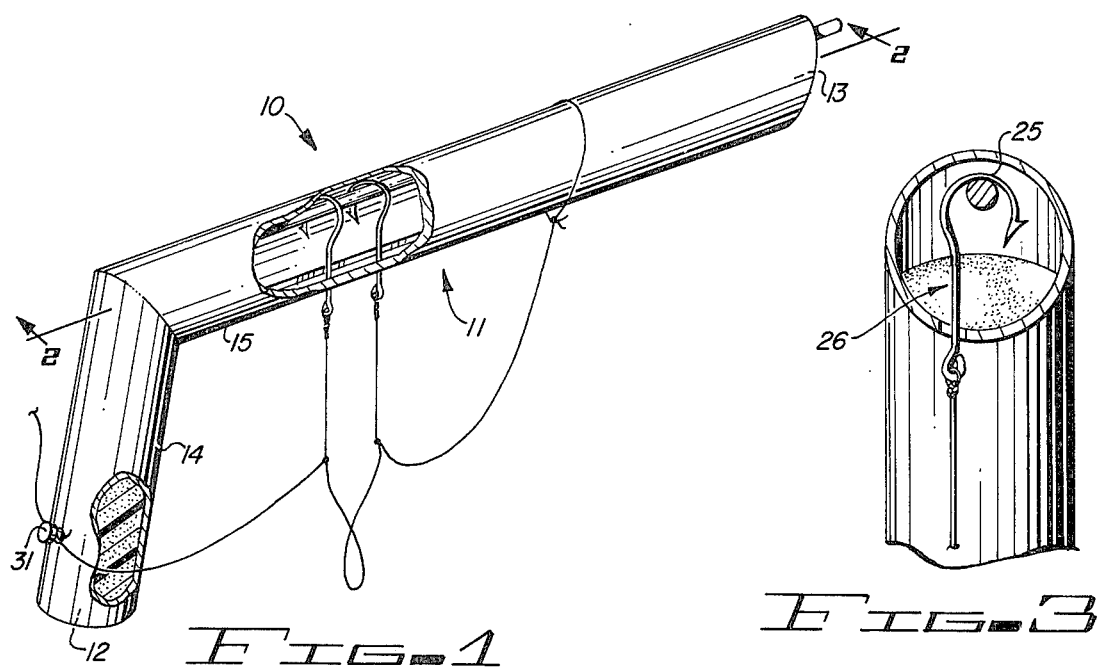
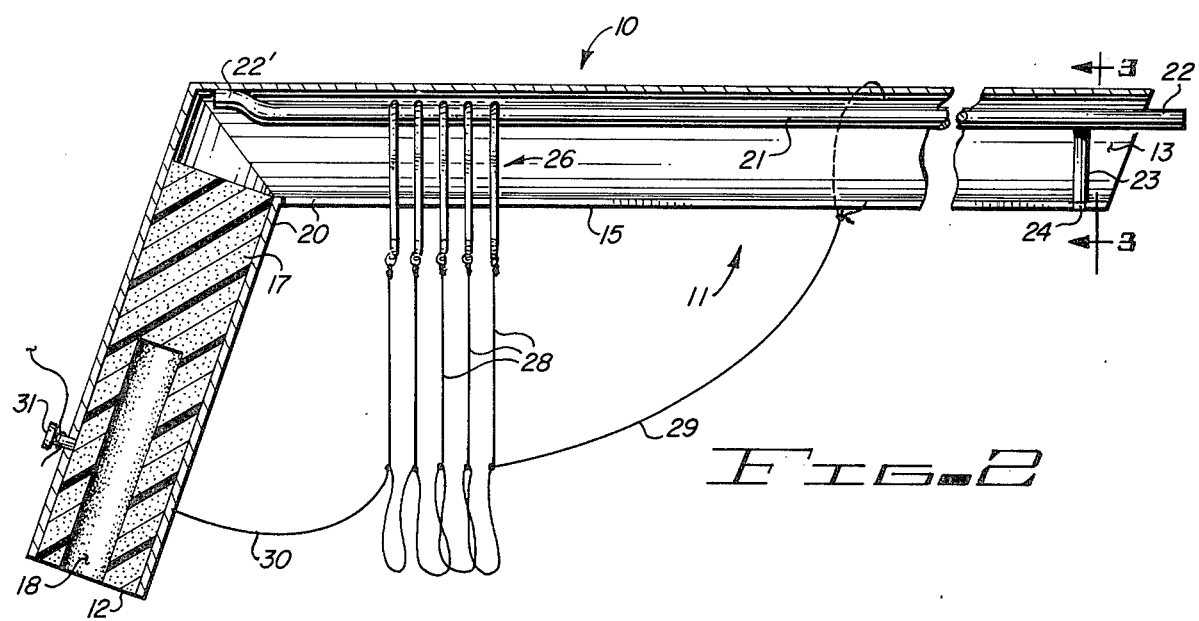
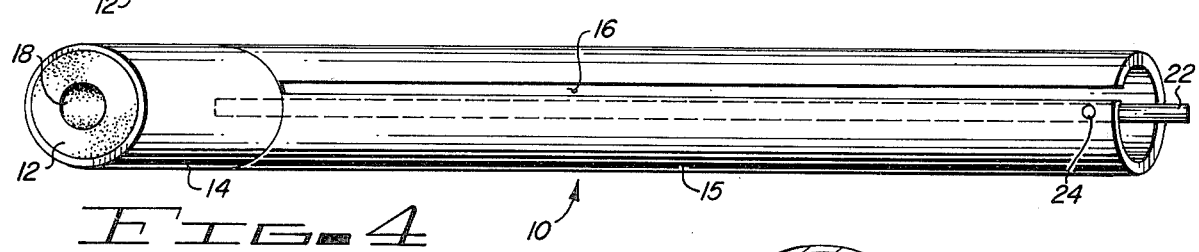
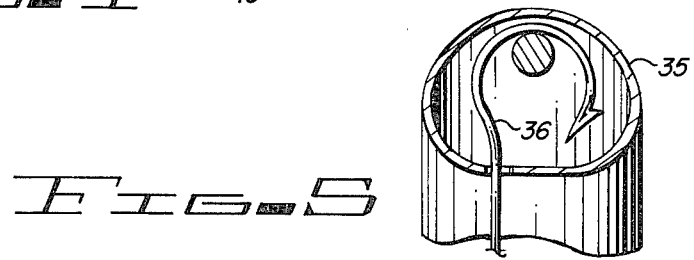

TROTLINE FISHHOOK HOLDER AND DISPENSER

BACKGROUND OF THE INVENTION

A trotline consists of a plurality of hooks suspended from a main line which may be placed between spaced stakes in a body of water with the hooks attached to the main line by stringers, leaders or the like. These stringers or the like cause the hooks to be suspended 18 inches or more below the water surface or submerged trotline. The hooks are generally required by state fishing regulations to be no closer than three feet from each other.

The placing of the hooks across or along a stream between stakes has been difficult, usually involving tangled hooks and lines using up a considerable amount of time to keep orderly as well as providing an unwanted hazard from the barbs of the sharp hooks.

As an alternative to this method of handling trotlines, holders and dispensers have been provided; however, they still have disadvantages which should be eliminated.

Fishhook holders for trotlines employing a slotted outer tube having an inner hook supporting shaft therein are known, but they possess the inherent disadvantage that with the inner shaft in a fixed location, utility of the shaft is limited to the size and type of fishhook used and the hooks are easily dislodged and at times uncontrollingly slip out of the holder.

SUMMARY OF THE INVENTION

In accordance with the invention claimed a new and improved trotline fishhook holder and dispenser is provided comprising an L-shaped tubular configuration having a handle portion adapted to be held by the fisherman or removably mounted on the transom of a boat, and a hook storage and holder portion having a rod extending laterally of and within the storage and holder portion of the holder and dispenser. The cylindrical housing of the storage and holder portion is slotted along its length such that the shank portions of the hooks which are supported by their bend portions at least partially surround the rod in a common direction and extend through the slotted portion of the cylindrical housing of the holder and dispenser.

The rod is fixedly mounted at one end only within the storage portion of the holder and dispenser such that its free end extending out of the storage and holder portion may move laterally to aid in releasing the hooks spacedly stored along its length causing them to slide out of the storage portion of the holder and dispenser and off of the free end of the rod.

It is, therefore, one object of this invention to provide a new and improved trotline fishhook holder and dispenser.

Another object of this invention is to provide an improved tubular trotline fishhook holding and dispensing device employing a rod mounted in the storage portion of the device for supporting a plurality of hooks which rod is movable laterally about a point within the storage portion of the device to aid in releasing the hooks held and stored therein.

A further object of this device is to provide an L-shaped trotline fishhook holding and dispensing device with one leg of the L-shaped device forming an obtuse angle with the other leg of the device for aiding in holding the hooks within the storage portion of the device.

A still further object of this device is to provide an adjustable trotline fishhook holder employing means for adapting it to store a variety of types and sizes of fishhooks at the same time.

A still further object of this invention is to provide a trotline line holder and dispenser which is simple, efficient, easy to carry and operate, and relatively inexpensive to manufacture.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawing, in which:

FIG. 1 is a perspective view of the trotline fishhook holding and storage device and embodying the invention;

FIG. 2 is a cross sectional view of FIG. 1 taken along the line 2—2;

FIG. 3 is a cross sectional view of FIG. 2 taken along the line 3—3;

FIG. 4 is a partial perspective view of the device shown in FIG. 1 illustrating the slotted configuration of the hook storage portion; and FIG. 5 is a partial cross sectional view of a modified hook storage portion of the device shown in FIGS. 1–4.

DESCRIPTION OF THE PREFERRED EMBODIMENT

Referring more particularly to the drawing by characters of reference, FIGS. 1–4 disclose a trotline fishhook holding and storage device 10 comprising a hollow generally L-shaped body or casing 11 preferably constructed of light weight one size metal or plastic tubing having opposite open ends 12 and 13. The holding and storage device is divided into a rear handle portion 14 and a forward storage or holder portion 15. The holder portion 15 has an elongated substantially rectangular slot 16 formed therein which extends substantially the full length of the holder portion 15 opening on the end of the holder portion, as shown in FIG. 4.

The handle portion 14 is preferably filled with a firm water buoyant material 17 which is provided with an opening 18 formed therein for receiving a peg or rod mounted, for example, on the transom of a boat, not shown.

As designed the portions 14 and 15 of device 10 form an L-shape configuration defining an obtuse angle 20 therewith which may be, for example, 110°. With portions 14 and 15 separated from each other in this manner the holder portion 15 would be positioned at an angle above the horizontal when hand carried or mounted on the transom of a boat to aid in keeping fishhooks positioned within the holder in the device.

A hook supporting rod 21 is disposed within the holder portion 15 of the device and preferably projects somewhat beyond the end 13 of the device.

Rod 21 is maintained in location within the holder portion 15 by having an off center end 22 suitably fastened to the inside of the holder portion 15 juxtapositioned to the handle portion as shown in FIG. 2. Fastened in this manner the end 22 of rod 21 may be grasped by a user and resiliently biased away from the upper portion of the inside wall of the holder portion to provide a greater clearance between the inside wall of the holder portion and the rod to cause the fishhooks mounted on the rod, as shown, to be easily slid off of end 22.

In order to stabilize the rod in the holder portion, rod 21 is provided with an arm member 23 extending laterally from rod 21 adjacent end 22 which is fitted into and moves freely through an aperture 24 in the tubular walls of the holder portion. Thus, as the rod 21 is biased away from the inside walls of the holder portion, a portion of arm member 23 moves through aperture 24.

As noted from FIGS. 1–3 of the drawing, the holder portion 15 of device 10 encloses substantially all of rod 21 which extends in its unbiased condition parallel with the axis of holder portion 15 and outwardly thereof beyond end 13. As can be seen, the bend portions 25 of fishhooks 26 are supported by the cylindrical portion of rod 21. The offset of end 22' of rod 21 places the cylindrical portion of rod 21 a small distance from the inside wall of holder portion 15, namely, a distance about twice the diameter of the wire from which the fishhooks are formed.

The shanks of the fishhooks extend outwardly of the cylindrical holder portion 15 of device 10, as shown in FIGS. 1 and 3, are attached by means of stringers 28 to the main line 29 which may be of a heavier gauge than the stringers. The leading end 30 of the main line 29 is generally attached to some part of the holder and dispenser and is shown herein as being fastened to a screw, bolt or rod 31 attached to the outside periphery of the handle portion 14.

As shown in FIG. 5, the tubular holder portion 35 of the device may be distorted to define an oblong cross sectional configuration to accommodate larger hooks 36.

OPERATION

The manner in which the device is used will be readily understood from the drawing and the above description. The dispenser is loaded with the desired number of hooks of like or different sizes; for example, about 50 or more which slide over the free end of rod 21 and into the holder portion 15. The barbs of the hooks are all intended to face in the same direction so as to protect the user when they are dispensed from the holding and dispensing device. The dispenser is fastened to a boat and the trailing edge of the main line is fastened to a fixed object on shore. Then the boat is propelled in the water away from the fixed object. This motion of the boat causes the holding and dispensing device to be aligned with the direction of motion and the tension on the main line causes the hooks to be pulled out, one by one off of rod 21. Floats may be placed at desired intervals on the main line. After all the hooks, or a desired number of the hooks are dispensed, the leading end of the main line may be fastened into the position in which the trotline is to be left. For example, it may remain fastened to the boat and the boat anchored or the leading end may be fastened to a fixed object on the shore opposite the first fixed object. Alternatively, the leading end of the main line may be fastened to a float which can be anchored in place in the water. After the trotline is set up, the hooks are baited or the hooks may be baited if so desired as they are dispensed.

After use, the trotline may be readily packed by slipping the bends of the hooks, in order, on rod 21, sliding the shanks of the hooks through the slot 16. After insertion of all the hooks, the stringers hanging out through the slot 16 may be tied around the holder portion 15 for storage.

It should be noted that slot 16 is offset from an imaginary line passing through the axes of rod 21 and holder portion 15 such that the barbs of the fishhooks may all face the same direction and be readily and easily inserted into and removed from the holding and dispensing device, as evident from the drawing. Further, it is desirable to coat or polish the metal forming slot 16 in holder portion 15 and the surface of rod 21 to help keep the surface of the hooks and their shanks from being rubbed off.

Although but one embodiment of the invention has been shown and described, it will be apparent to those skilled in the art that various changes and modifications may be made therein without departing from the spirit of the invention or from the scope of the appended claims.

What is claimed is:

1. A tubular fishhook holding and dispensing device for a trotline having spaced stringers with each stringer having a fishhook composed of a shank portion, a bend portion and a barb, said device comprising:

a handle portion and a holder portion, said handle portion and said holder portion being interconnected in an end to end arrangement forming generally an L-shaped configuration, said holder portion being hollow and having a slit extending from its free end toward said interconnected end and having a rod with an offset end positioned therein, said rod being secured at its offset end to the inside periphery of said holder portion adjacent said handle portion, said rod extending coextensive with said holder portion and outwardly a predetermined distance from its free end, said rod being spaced from one portion of the inner peripheral wall of said holder portion by its offset end a distance slightly greater than the diameter of the fishhooks, whereby the fishhooks may be slid over the free end of said rod with their shanks extending through said slit of said holder portion for movement in an orderly manner toward the interconnected ends of said handle portion and said holder portion, a guide means attached to said rod at its free end to extend laterally thereof within said holder portion, and an opening in said holder portion at a point substantially diagonally opposite from said one portion of said inner peripheral wall of said holder portion for receiving said guide means, said guide means moving through said opening when said rod is deflected from adjacent said one portion of said inner peripheral wall of said holder portion for readily receiving and dispensing fishhooks from said device.

2. The tubular fishhook holding and dispensing device set forth in claim 1 wherein:

said handle portion and said holder portion are interconnected in end to end arrangement at an obtuse angle.

3. The tubular fishhook holding and dispensing device set forth in claim 1 wherein:

said handle portion and said holder portion are interconnected to form substantially a 110 degree angle therebetween.

4. The tubular fishhook holding and dispensing device set forth in claim 1 wherein:
said handle portion is substantially filled with a floatable material.

5. The tubular fishhook holding and dispensing device set forth in claim 4 wherein:
an opening is provided in the free end of said handle portion for receiving a supporting peg.

6. The tubular fishhook holding and dispensing device set forth in claim 1 in further combination with:
a trotline having a plurality of stringers mounted along said line,
each of said stringers having a fishhook mounted at one end thereof, and
each of said fishhooks being mounted on said rod with its shank extending through said slit in said holder portion,
one end of said trotline being fastened to the outer periphery of said handle portion.

* * * * *